United States Patent [19]

Kirkbride

[11] 4,279,722

[45] Jul. 21, 1981

[54] USE OF MICROWAVES IN PETROLEUM REFINERY OPERATIONS

[76] Inventor: Chalmer G. Kirkbride, 13 Elk Forest, R.D. #2, Elkton, Md. 21921

[21] Appl. No.: 131,167

[22] Filed: Mar. 17, 1980

Related U.S. Application Data

[63] Continuation of Ser. No. 954,303, Oct. 24, 1978, abandoned, and a continuation-in-part of Ser. No. 831,170, Sep. 7, 1977, abandoned.

[51] Int. Cl.³ .................... C10G 45/72; C10G 47/36; C10G 35/04; C07C 4/00
[52] U.S. Cl. ................................ 204/162 R; 208/108; 208/113; 208/134
[58] Field of Search ............................. 208/108–113, 208/134; 204/162 R; 585/240, 241

[56] References Cited

U.S. PATENT DOCUMENTS

| | | | |
|---|---|---|---|
| 3,449,213 | 6/1969 | Knapp et al. | 208/8 X |
| 3,503,865 | 3/1970 | Stone | 208/10 |
| 3,616,375 | 10/1971 | Inoue | 204/162 R |
| 3,843,457 | 10/1974 | Grannen et al. | 201/8 X |
| 4,076,607 | 2/1978 | Zavitsanos et al. | 204/162 R |
| 4,118,282 | 10/1978 | Wallace | 208/8 R |

*Primary Examiner*—Delbert E. Gantz
*Assistant Examiner*—G. E. Schmitkons
*Attorney, Agent, or Firm*—Fidelman, Wolffe & Waldron

[57] ABSTRACT

Petroleum refinery operations involving catalytic reactions are improved by subjecting hydrocarbon reactants in contact with catalytic material to the influence of wave energy in the microwave range.

11 Claims, 1 Drawing Figure

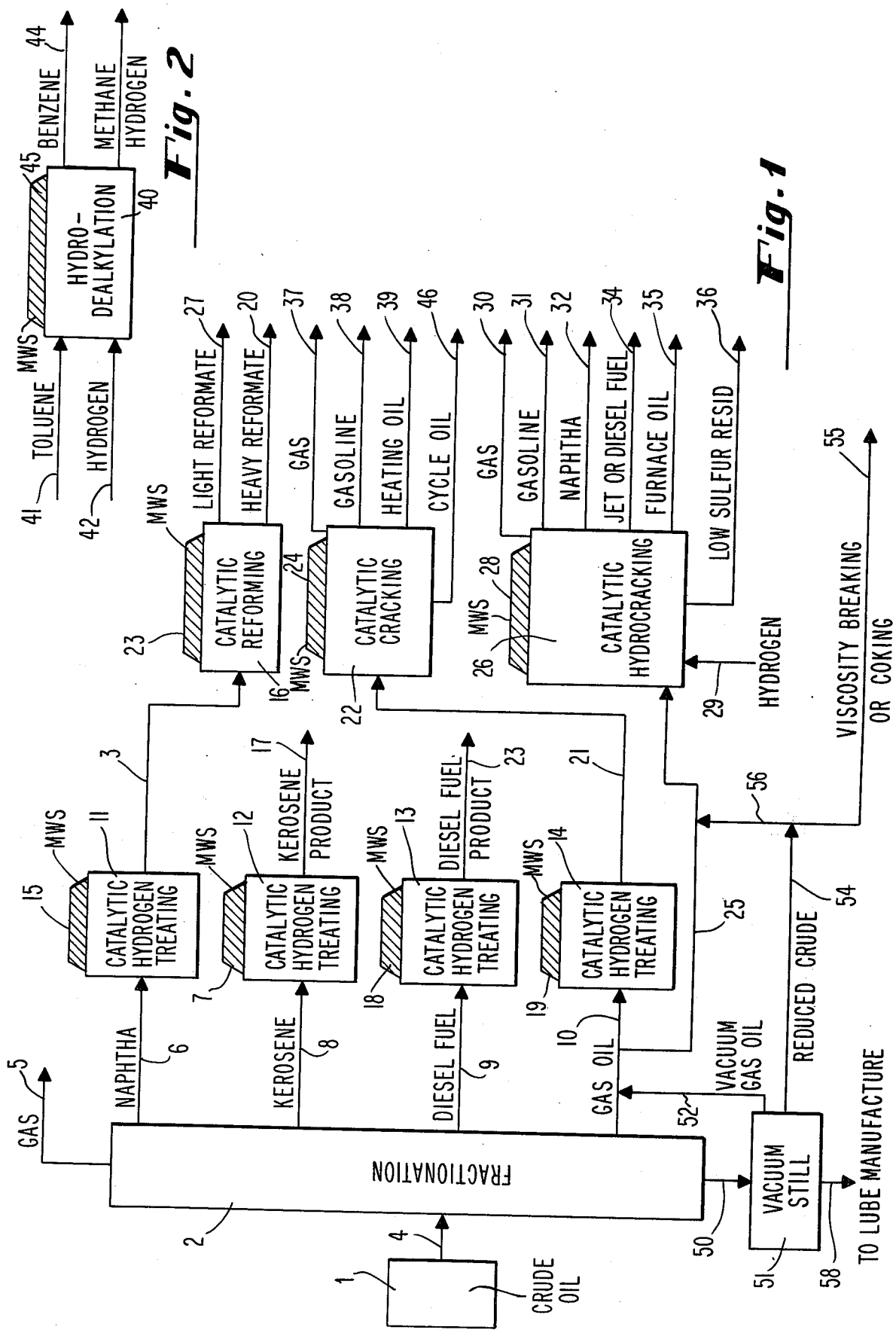

USE OF MICROWAVES IN PETROLEUM REFINERY OPERATIONS

BACKGROUND OF THE INVENTION

This is a continuation of application Ser. No. 954,303, filed Oct. 24, 1978, now abandoned.

This application is a continuation in part of Patent Application Ser. No. 831,170 filed Sept. 7, 1977, now abandoned which application teaches a process for decreasing the sulfur content of coal by subjecting dry coal and hydrogen to the influence of wave energy in the microwave range.

Patent Application Ser. No. 954,302 filed Oct. 24, 1978 is a division thereof and is directed to the reduction of the sulfur content of petroleum liquids by subjecting the petroleum liquid and hydrogen to microwave energy. Attention is also directed to Patent Applicaton Ser. No. 831,171 filed Sept. 7, 1977, which teaches the recovery of oleaginous products from shale by subjecting shale in contact with hydrogen to microwave energy; and to Patent Application Ser. No. 896,003 filed Apr. 13, 1978, which teaches decreasing the sulfur content of coal by contacting a slurry of dry coal in a solvent of microwave energy; and to Patent Application Ser. No. 896,004 filed Apr. 13, 1978, which teaches the regeneration of cracking catalyst deactivated in a process of cracking petroleum hydrocarbons by subjecting the deactivated catalyst in contact with hydrogen to microwave energy.

The use of microwaves to generate heat in a uniform and controlled fashion is well known. Thus U.S. Pat. No. 3,503,865, issued Mar. 31, 1970, teaches liquifying coal by subjecting coal particles to microwaves under conditions including a temperature of from 100° C. to 500° C. U.S. Pat. No. 3,449,213 teaches obtaining chemicals from coal by first heating coal to an elevated temperature and then increasing the temperature to about 800° F. using microwaves wherein the final heating with mircowaves is done in a partial vacuum.

The use of catalytic reactions in petroleum refining to convert petroleum hydrocarbons to other hydrocarbons by reaction or rearrangement has long been known. Catalytic processes commonly used include catalytic reforming, catalytic cracking, catalytic hydrocracking, catalytic alkylation, and catalytic polymerization. Much effort has been expended in developing catalysts for these reactions and in particular to developing active catalysts which will cause rapid conversion of the reactants to the desired products with a minimal increase in undesired products. It is also entirely possible to have catalysts which are too active for the purpose intended. Thus, in catalytic cracking, an overactive catalyst will produce disproportionately high quantities of coke and gas rather than the desired distillate products.

An object of the present invention is to provide a novel process for performing catalytic reactions. A specific object is to provide a novel process for performing petroleum refinery operations under conditions less severe than heretofore have been obtained. Another object is to obtain a high throughput for a given process; i.e., to carry out a given process with high reactant-catalyst ratios. A further object is to provide a process in which reactors can be used containing less catalyst than has heretofore been possible.

DETAILED DESCRIPTION OF THE INVENTION

It has now been found that catalytic reactions, including molecular rearrangements, involving petroleum hydrocarbons are accelerated by the application of microwave energy to the hydrocarbons undergoing catalytic reaction. For example, processes commonly used in petroleum refineries including catalytic reforming, catalytic cracking, catalytic hydrocracking, hydrodealklation and catalytic polymerization give enhanced results wherein the reaction involved is carried out under the influence of microwave energy. The application of microwave energy to catalytic reaction, in general, permits the reaction in question to be perfomed under less severe conditions, such as a lower temperature, and/or lower pressures, and/or shorter catalyst contact times. This results in a substantial saving in utility costs. The lower catalyst contact times make possible the use of smaller reaction vessels containing smaller than usual amounts of catalyst, which results in a significant saving in capital investment for equipment and for catalyst inventory. Also, as has been found, catalyst life is greatly extended, especially where the catalytic process is performed in the presence of hydrogen, making regeneration significantly less frequent. This makes the present invention especially applicable to the catalytic process carried out in the presence of hydrogen, and the hydrogen may be added to or generated in the process.

While it is not desired to be limited by theoretical considerations, it is believed that the microwave or microwaves, where a plurality of microwave frequencies is used, induces resonance in specific bonds of the reactive materials and/or causes the active sites of the catalyst to become increasingly active so that the desired reactions occur rapidly under less severe conditions than could be otherwise obtained. The input frequency of the microwave energy is therefore selectively tuned to induce resonance at the hydrocarbon bond or bonds to undergo transformation; where different hydrocarbon bonds are involved in the same operation, two or more frequencies are used to great advantage in accordance with the present invention.

The wave energy to use in the present process is in the microwave range and may be from 2.5 to 1,000 gigacycles per second ($2.5 \times 10^9$ to $10^{12}$ cycles per second respectively). These frequencies may be expressed using the Hertz (Hz) Unit, and are the same as from 2.5 to 1,000 gigahertz (1,000 GHz). As used herein "megacycles" means "megacycles per second" unless otherwise stated. With some catalytic reaction it may be advantageous to use two or three or even more frequencies simultaneously or consecutively, as above described, as this may be the most efficient operation. While again it is not desired to be limited by theoretical consideration, it is believed that a single frequency does not give optimum activation at all of the bonds where reaction occurs, or of the active catalyst sites. Thus, the bond connecting a tertiary carbon atom of an aliphatic-type molecule may receive maximum activation at one frequency, while the double bond of an olefinic molecule may receive maximum activation at a different frequency. Also, with two independent microwave sources, frequencies of at least $2 \times 10^{12}$ Hz can be obtained and, when properly tuned, the combined microwave can be used to excite, or activate, specific types of bonds or atoms with little or no effect on adjacent atoms or bonds of a different type. For a given catalytic reaction, the microwave or combination of microwaves for optimum results is best determined experimentally. For simultaneous operation, the reactant or reactants in contact with the catalyst is subjected to two or more wave energy sources of different frequencies at the same time. For consecutive operation, the reactant or reactants in contact with the catalyst is subjected to wave energy sources of different frequencies at different times, usually one immediately following the other. An alternative means for consecutive operation which is especially useful where moving or fluidized bed operations are used is to space microwave energy sources of different frequencies along the path of the reactants and catalyst particles in the reactor. When using different frequencies, the total time of exposure of the reactants and catalyst to the wave energy will be relatively short because of the high efficiency of the operation, so that times of exposure in the lower portions of the operable ranges give good results. The desirability of using a multiplicity of wave energy sources and the frequencies to use are best determined by experimentation for given reactants and catalyst, as above stated. The equipment for generating microwaves is well known to those skilled in the art. Continuous wave magnetrons with accompanying electronic equipment, which usually will include an amplifier and a radiation device for transmitting the wave energy, give good results, and the choice and use of such equipment will be apparent to those skilled in the art.

The accompanying figures are schematic diagrams in the form of flow sheets illustrating refinery operations conducted in accordance with the present invention.

FIG. 1 is intended to illustrate operations in a refinery primarily directed to the production of distillate products including gasoline, heating oil, jet fuel, diesel fuel, furnance oil and the like, as opposed to refineries primarily directed to lubricating oil manufacture.

FIG. 2 is directed to the specific refinery operation of hydrodealkylation. No novelty is claimed for any arrangement of an operation of series of operations, the present invention being directed to the use of microwave energy in the several catalytic processes as illustrated in the diagram and as discussed hereinafter. It should be understood that the diagrams are schematic only and numerous operations including fractionation towers which would normally follow catalytic reforming, catalytic cracking, etc. are not shown and pumps, heat exchangers and the like have been omitted.

In FIG. 1, crude oil is introduced from storage tank 1 into fractionation tower 2 through line 4. This tower is conventional, and gas is removed from fractionation tower 2 through line 5. Naphtha, kerosene, diesel fuel and gas oil are removed from fractionation tower 2 as separate fractions through lines 6, 8, 9 and 10 respectively; and each fraction is passed to a catalytic hydrogen treating process. The primary purpose of each of these catalytic hydrogen treating processes is to reduce the sulfur content of the fraction and to saturate unsaturated bonds. Nitrogen and oxygen contents of the fractions are also significantly reduced. Thus, the mentioned fractions are treated in vessels 11, 12, 13 and 14 respectively by contacting with hydrogen in the presence of known hydrogenation catalysts. Oxides and sulfides of cobalt, molybdenum, nickel, or combinations thereof, extended on bauxite, synthetic alumina, or silica-alumina give good results. Molybdenum sulfide extended on silica-alumina is a preferred catalyst. Hydrogen is maintained at a pressure of from about 5 psi (pounds per square inch) to 3,000 psi although higher pressures can be used. A temperature of from about 60° F. to 400° F. is advantageously maintained and it will be noted this temperature is significantly below the 750° F. normally used for this type of reaction. Ambient temperature may be used to good advantage in many instances. A space rate of from about 1 to 10 V/V/H (volume of hydrocarbon per volume of catalyst per hour). This space rate is significantly higher, about 20% to 60%, than the space rate normally employed in comparable operations without microwave energy being used. During the hydrogen treating reaction the mixture of naphtha and hydrogen contacting the hydrogenation catalyst is subjected to microwave energy from microwave source (MWS) 15. Two microwave sources are advantageously used and for the hydrogen treating process a frequency of at least 2.5 GHz is used. It is this use of microwaves that permits the use of the relatively low temperatures and pressures and the high space velocities obtainable. Also the high space velocities permit the use of smaller reactors and the maintaining of a smaller inventory of catalyst.

In like manner, kerosene, diesel fuel and gas oil are treated in their respective separate catalytic hydrogen treating vessels under the influence of MWS 7, 18 and 19 respectively. The same catalyst as described for treating naphtha and substantially the same conditions may be used although, with increasing boiling range of the treated material, somewhat higher temperatures may be employed. For example, the kerosene treating is advantageously carried out at 100° to 200° F., the diesel fuel treating at 150° to 350° F., and the gas oil treating at 300° to 500° F. It is understood that the introduction of hydrogen to the reaction zone and the removal of contaminated hydrogen, its purification and return to the treating zones, are all by known means and are not shown in the diagram.

As shown in the diagram, kerosene and diesel fuel subjected to catalytic hydrogen treatment under the influence of microwave energy form stable, clean burning products with the diesel fuel being of high cetane number.

Naphtha, which has been treated in zone 11 to remove sulfur, nitrogen and oxygen compounds of low octane number, is advantateously passed through line 3 to caralytic reforming zone 16. This zone contains MWS 23. Catalytic reforming is a well known process and the present process essentially differs from the teachings of the art by applying microwave energy to the hydrocarbons in contact with the catalyst, in the use of less severe conditions of temperature and pressure, and in the use of a faster space rate. As the catalyst, a platinum catalyst having the platinum extended on a carrier material such as alumina is preferred, and the addition of a halogen to the process gives excellent results, as is well known in the art. Temperatures of from 850° F. to 1,000° F. and pressures of from 200 psi to 700 psi are commonly employed in the art with a space velocity of 1 to 4 pounds of naphtha per pound of catalyst per hour giving good results. In accordance with the present invention, generally less severe conditions or conditions in the lower portions of the known ranges, are used, although one or more of the conditions may overlap with the broader ranges taught by the art. Thus, in the present invention, while subjecting the naphtha in contact with the platinum reforming catalyst to microwave energy, a temperature of from 300° F. to 800° F. at pressures of from 100 psi to 400 psi and space velocities of from 4 to 10 pounds of naphtha per pound of catalyst per hour give excellent results. In the reforming process, naphthene rings are dehydrogenated to form aromatic rings and produce benzene, toluene and xylenes with the concomitant production of hydrogen. It is believed the presence of this hydrogen in the reforming operation carried out under the influence of microwave energy gives an exceptionally long catalyst life so that the regeneration of the catalyst may be extended from the usual 2 to 5 months to 10 months or more. The other reactions well known in catalytic reforming occur, including dehydrocyclization, isomerization and dehydroisomerization, and the product is advantageously separated into a light reformate and a heavy reformate for further use as for gasoline, which are shown schematically being removed as products through lines 27 and 20 respectively.

The product from catalytically treating gas oil in vessel 14 is removed therefrom through line 21 and passed to catalytic cracking zone 22. Advantageously the catalytic cracking is with a fluidized operation, as described in my Patent Application Ser. No. 896,004, filed Apr. 13, 1978. The cracking operation is performed as described by the art except that the material being cracked in contact with a cracking catalyst is simultaneously subjected to microwave energy shown schematically as MWS 24. In actual operation the microwave source is advantageously spaced in the riser cracker and, where desirable, an additional source, which may be of a different frequency, is spaced in the reactor. Generally fluid catalytic cracking is performed under temperatures of 850° F. to 1,000° F., at pressures of about 30 psi to 50 psi and space velocities of about 1 to 3 V/V/H. In accordance with the present invention, less severe conditions can be used and advantageously the reactor temperature is maintained in the range of from 400° F. to 800° F., pressures of from 20 to 40 psi and a space velocity of from about 3 to 8 V/V/H. The microwave energy is advantageously at a frequency of 2.5 GHz, but 10 GHz or a combination gives good results. In the present process, as has been noted, required regeneration of the catalyst is less severe than in the usual cracking process; and it is believed that the presence of microwave energy activates catalyst sites which render them more active for cracking reactions but that the reactions occur at a sufficiently high rate to prevent the formation of coke, which would deactivate the catalyst, and undesired gaseous products. Catalyst used are those generally used in fluid cracking operations and include naturally occuring clays which have been activated and synthetically prepared composites such as silica-alumina, silica-zirconia and silica-magnesia. Zeolites in a silica-alumina matrix give excellent results. In the fluidized process the catalyst particles are in the form of a powder generally of size rage of from 20 to 150 microns. Products from the catalytic-cracking, gas, gasoline,, heating oil, and cycle oil, are moved through lines 37, 38, 39 and 46, respectively. The cycle oil removed through line 46 is advantagously used in the manufacture of high grade lubricating oils.

Gas oil from fractionator 2 may bypass catalytic treater 14 and pass via line 25 to catalytic hydrocracking as shown by 26. During the catalytic hydrocracking reaction, the reactants and catalyst are simultaneously subjected to the influence of microwaves from MWS 28. In accordance with the present invention, the use of MWS in catalytic cracking is particularly advantageously because the presence of added hydrogen, shown as added via line 39, enhances the action of the microwaves to achieve the desired products. In hydrocracking there is very little carbonizing of the active cracking sites of the catalyst; the formation of coke and gas is almost completely inhibited. Reactions of olefin saturation, the cleavage of chains from ring compounds, the splitting of non-fused bicyclic structures into separate rings, and rupture of the ring of various ring compounds all occur simultaneously with the destruction of sulfide bonds to form hydrogen sulfide. Any hydrogen sulfide formed is removed with the gas product via line 30 and is separated by known means. Major products are usually gasoline, naphtha, jet or diesel fuel, furnace oils and low sulfur resid, and are recovered via lines 31, 32, 34, 35 and 36, respectively. In general, the products are almost totally saturated and stable (assuming aromatics to be classed as saturated), which contain substantially no sulfur and no nitrogen. The diesel fractions are of high cetane number; the furnace oils, including kerosene, of high smoke point; and the jet fuels are substantially non-smoking. The low sulfur resid (line 36) is advantageously used for burning or may be sent to a viscosity breaking operation. Highly active cracking catalysts give good results. Silica-alumina or other base material containing natural or synthetic zeolites gives good results. Noble metals such as platinum have been described as assisting the catalytic reaction. Where desired, a two-stage process can advantageously be used wherein the gas oil is first contacted with hydrogen in a hydrotreater, as shown by 14, using a cheaper, more more resistant catalyst than used in the hydrocracker, such as sulfided nickel, molybdenum, or cobalt. This removes the sulfur and hydrogen compounds so that the second, more expensive catalyst will last longer and can be easily regulated. Fixed bed, moving bed and ebullating bed, in which the catalyst particles are suspended in liquid and agitated by hydrogen may be used. In the present invention the efficiency of operation with the use of microwave enegy is such that only a single stage of cracking is preferred, i.e., the use of a preliminary hydrogen treating is not necessary. Temperatures commonly used in the hydrodesulfurization process are in the range of 500° F. to 850° F. and pressures are from about 750 psi to 2,000 psi with an excess of hydrogen being used to maintain the pressure. In the present invention significantly lower temperatures of from 200° F. to 450° F. are employed with good results although, of course, higher pressures may be used. Also lower pressures in the range of from 500 psi to 1,000 psi give good results. Hydrogen for use in the process is advantageously from catalytic reforming 16 (not shown) and when necessary, additional hydrogen can be provided by known processes such as reforming methane or hydrocarbon gases in the presence of steam. My invention in this phase of petroleum refinery operation is the conducting of catalytic hydrocracking in which the reactants, hydrogen, and catalyst are contacted while under the influence of microwave energy. This permits the catalytic hydrocracking to occur under relatively low temperatures and pressures and relatively high space rates so that the size of the catalytic reactor can be decreased and the inventory of catalyst can be decreased significantly, say from 10% to 50% below that required in the usual catalytic hydrocracking processes.

The bottoms from fractionation 2 pass via line 50 to vacuum still 51. Vacuum gas oil from still 51 passes via line 52 to mix with gas oil in line 10. Reduced crude is passed via line 54 to viscosity breaking or coking via line 55, or via lines 56 and 25 to catalytic hydrocracking.

Hydrodealkylation is a refinery process in which short chains are removed from aromatic hydrocarbons. Thus toluene may be converted to benzene or xylenes to toluene and benzene, the toluene and/or xylenes being recoverable from catalytic reforming 16 (not shown). With reference to FIG. 2, hydrodealkylation is shown taking place in vessel 40 by introducing toluene through line 41 and hydrogen through line 42 with benzene, the product of the process, being removed through line 44. In hydrodealkylation a cracking catalyst such as chromia-alumina, silica-alumina or silica-magnesia, or a natural or synthetic zeolite material, give good results. In accordance with the present invention, the reactants while in contact with the catalyst are subjected to MWS as shown by 45. Temperatures in the range of 1,000° F. to 1,200° F. and pressures of 500 psi to 1,200 psi give good results and are about 20% to 40% below the required temperatures and pressures to get good results in prior processes. When using dual sources 2.5 megaHz properly tuned, the temperature can be reduced to 400° F. to 500° F. Fixed bed catalyst operation or other type operation as known to the art may be used.

Gaseous olefins, principally ethylene and propylene, are prepared in the several refinery cracking operations and may be separated by fractionation and absorption techniques well known in the art. The polymerizations of these olefins give valuable products and are considered refinery operations. For simplicity, these operations are herein described without reference to schematic flow diagrams. Ethylene may be polymerized to polyethylene and propylene to polypropylene. These polymerizations are advantageously carried out using a Ziegler-type catalyst. A catalyst which is especially effective for the polymerization of normally gaseous olefins to relatively high molecular weight, solid polymers is the combination of a lower halide of a metal, such as titanium trichloride, and an aluminum triethyl. This catalyst can be prepared by admixing, for example, titanium tetrachloride and aluminum triethyl in an inert liquid such as isooctane. On admixing the two components, a finely divided solid phase is formed as a dispersion in the inert liquid. This solid phase is a catalyst for polymerizing normally gaseous olefins to solid polymers. If desired, a lower halide such as titanium trichloride can be preformed, dispersed in an inert liquid, and an activator such as an aluminum trialkyl added. In performing the polymerization step, a normally gaseous olefin is contacted with the solid catalyst by passing the olefin through a suspension of the finely divided solid in the inert liquid, and is thereby polymerized to solid polymers.

The polymerization of a normally gaseous olefin is performed in an inert, liquid reaction medium. Saturated hydrocarbons including the pentanes, hexanes, heptanes, decanes, mixtures thereof and the like, cycloparaffins such as the cyclopentanes, and cyclohexanes, and mixtures thereof with each other and with paraffins can be used with good results.

The polymerization can be carried out batchwise or as a continuous process in the hydrocarbon diluent at moderate temperatures, usually from 20° C. to about 120° C., and at pressures of from 1 to 40 atm. The propylene is added at a controlled rate to the catalyst slurry and the crystalline polymer precipitates as a finely divided granular solid enveloping the catalyst particles. After the polymerization, a suitable reagent is added to kill the catalyst activity and to dissolve the catalyst particles from the polymer. Atactic, or noncrystalline, polymer is separated from the isotactic or crystalline polymer by dissolving the atactic material in a solvent such as heptane. Molecular weights of from 50,000 to 200,000 and higher are commonly obtained. The addition of hydrogen to the propylene feed can be used to regulate the molecular weight since the hydrogen acts as a chain stopper. Partial pressures of hydrogen are advantageously from about 50 psi to 500 psi for usual operation. In accordance with the present invention, microwave energy is applied to propylene while contacting the slurry of solid catalyst particles and, as has beeen found, greatly enhanced results are obtained. Thus, the speed of reaction is increased from two to eight times, the quantity of isotactic polymer is decreased significantly and the molecular weight spread of the crystalline polymer can be regulated to a relatively narrow range by using properly tuned microwaves. Also the use of hydrogen can be discontinued although advantages may be obtained by its presence in assisting to regulate the molecular weight. A particular advantage is the relatively large amount of polymer which can be obtained per unit of catalyst. For example, under equivalent conditions, an increase of ten to fifty times (pounds of polymer per pound of catalyst) is obtained when using the present invention. Also, an increase of the polymerization rate of from two times and up to ten times can be achieved using properly tuned microwaves. The very small amount of catalyst used, for most uses of the polymer, need not be removed therefrom, thus eliminating a step in the usual polymerization process.

In like manner, microwave energy is advantageously applied to the polymerization of ethylene with Ziegler type catalyst, and substantially the same results and advantages are achieved as for preparing polypropylene.

To illustrate preferred refinery operations in accordance with the invention, a paraffin-base, midcontinent crude oil containing about 85% C, 14% H, 0.05% N, 1.4% O and 1.0% S is passed through line 4 from storage 1 to fractionation tower 2. Gas is removed from line 5 and consists of hydrocarbons boiling below about 90° F. The naphtha fraction removed through line 6 is the next higher boiling fraction, has an end point of about 400° F., and is passed to catalytic hydrogen treating as indicated by 11, where it is treated with hydrogen in contact with a fixed bed of catalyst under the influence of MWS shown at 15. The catalyst was commercially available and consisted of cobalt and molybdenum sulfide supported on silica-alumina. The hydrogen treating is conducted at a temperature of 200° F., a space rate of 6 V/V/H, and a pressure of 200 psi using an excess of hydrogen so that substantialy all the sulfur is converted to hydrogen sulfide. The MWS 15 is advantageously a dual source of 2.5 GHz microwaves. A hydrogen treated naphtha, being substantially free of sulfur, nitrogen and oxygen compounds, is then passed to catalytic reforming 16 via line 3.

The next higher fraction is a kerosene fraction removed from fractionation 2 via line 8. It has a boiling range of about 300° F. to 600° F. and is catalytically treated with hydrogen in 12 under the influence of MWS 7 as for the naphtha fraction to form the kerosene product removed by line 17. The catalytic treating step is carried out under substantially the same conditions and catalyst as for the naphtha in 11. The kerosene product is a stable, clean burning kerosene of substantial commercial value, and is recovered via line 17.

The next higher boiling fraction is diesel fuel boiling in the range of from about 400° F. to 650° F., and is removed from fractionation 2 via line 9 and passed to catalytic hydrogen treater as shown at 13 under the influence of MWS 18. The diesel fuel product is removed through line 23 and is a high cetane, stable diesel fuel. The conditions of catalytic hydrogen treating may be substantially the same as described for treatment in 11, including the catalyst used.

The next higher boiling fraction is a gas oil boiling in the range of from about 500° F. to 800° F. and is removed from fractionation 2 via line 10 to catalytic hydrogen treating 14 under the influence of MWS 19. Here again the catalytic treatment can be substantially the same as described for 11 except that a somewhat higher temperature, say around 400° F., is advantageously employed. The catalytic treated material leaves 14 via line 21 and is passed to catalytic cracking 22. A portion of the gas oil removed from fractionation is passed via line 25 to catalytic hydrocracking 26.

The residual or bottoms fraction from fractionation 2 is passed via line 50 to vacuum still 51, wherein the vacuum gas oil having a boiling range of from about 600° F. to 800° F. is flashed off and recovered via line 52 and returned to gas oil line 10 for catalytic hydrogen treating in 14 or catalytic hydrocracking in 26. Reduced crude boiling from about 800° F. to 1,200° F. is passed via lines 54 and 56 to hydrocracking 26 with a portion or all of the reduced crude going to viscosity breaking or coking operations (not shown) as desired via line 55. The bottoms fraction from the vacuum still is advantageously passed through line 58 to lubricating oil manufacture, which forms no part of the present invention.

The effluent from catalytic hydrogen treating 11 is passed via line 3 to catalytic reforming 16. A platinum on alumina commercially available catalyst is used and MWS 18 is at 2.5 GHz frequency. The well known reforming reactions occur giving a net production of hydrogen, which is recovered and advantageously passed to catalytic hydrocracking 26 (by means not shown). Catalytic reforming conditions are used except that a lower temperature and faster space velocity than normal are used. Thus the catalytic reforming conditions include a temperature of about 600° F., a space velocity of about 4 pounds of naphtha per pound of catalyst per hour, and a pressure of about 300 psi. The light reformate, which is a valuable high octane component for gasoline, is recovered via line 27 and a heavy reformate, which is a valuable high octane hydrocarbon stream useful in gasoline or chemical manufacture, is recovered through line 20.

Gas oil from fractionation 2 through line 25, vacuum gas oil from vacuum still 51 via lines 52 and 25, and reduced crude from vacuum still 51 via lines 54 and 56, or any combination thereof, are introduced to catalytic hydrocracking 26. In hydrocracker 26 the hydrocarbon materials are reduced in molecular weight and are saturated to form stable products with substantially no sulfur or nitrogen content. The presence of hydrogen almost eliminates the formation of coke and gaseous materials. Catalytic hydrocracking conditions are employed except that the temperature is lower than normal and the space velocity is higher than normal so that a temperature of about 400° F., a space velocity of about 6 V/V/H, and a pressure of about 800 psi are preferred, and these relatively mild conditions are made possible by MWS 28, which comprises two sources of microwaves spaced apart in the reactor with one being tuned to 2.6 GHz and the other to 10 GHz. The products of the hydrocracking, gas gasoline, naphtha, jet or diesel fuel, furnace oils and low sulfur resid, are recovered through lines 30, 31, 32, 34, 35 and 36, respectively. These constitute products of the process although certain of the fractions, such as naphtha recovered through line 32, are advantageously recycled to line 3 for catalytic reforming in 16; further catalytic hydrogen treating as in 11 is not necessary because the sulfur compounds have been substantially removed in 26.

Gas oil from hydrogen treater 14 is passed via line 21 to catalytic cracking 22. MWS 24 operating at 10 GHz frequency is applied to the reactants in contact with the catalyst at a temperature of 600° F., a pressure of 30 psi, and a space rate of 8 V/V/H. Catalyst deactivation is greatly retarded so that the removal of spent catalyst and the addition of make-up catalyst is reduced about 12%.

Many variations in my invention can be made, which is the conducting of petroleum refinery operations involving catalytic reactions of petroleum hydrocarbons by subjecting the catalyst and hydrocarbon reactants, while in contact, to microwave energy.

The invention claimed is:

1. A method of operating a catalytic petroleum refinery process comprising performing a catalytic operation for conversion of liquid hydrocarbons derived from petroleum by exposing said liquid hydrocarbons mixed with catalyst to sufficient microwave energy in the frequency range of about $2.5 \times 10^9$ to $10^{12}$ hertz in the absence of coal particles to enhance conversion of said liquid hydrocarbons.

2. The method of claim 1, wherein the catalytic operation is performed under relatively mild conditions of temperature and pressure and relatively low catalytic contact times.

3. The method of claim 2, wherein the catalytic operation is performed in the presence of hydrogen.

4. The method of claim 3, wherein the catalytic refinery operation is catalytic reforming.

5. The method of claim 2, wherein at least two microwave sources are employed in the same operation.

6. The method of claim 5, wherein each microwave source is operated at a different frequency.

7. The method of claim 6, wherein the microwave sources are operated simultaneously.

8. The method of claim 6, wherein the microwave sources are operated consecutively.

9. A method of operating a catalytic petroleum refinery process comprising performing a catalytic cracking operation for conversion of liquid hydrocarbons derived from petroleum by exposing said liquid hydrocarbons mixed with catalyst in the absence of coal particles to sufficient microwave energy to enhance conversion of said liquid hydrocarbons.

10. The method of claim 9, wherein the catalytic operation is performed under relatively mild conditions of temperature and pressure and relatively low catalytic contact times.

11. The method of claim 10, wherein the catalytic operation is performed in the presence of hydrogen.

* * * * *